(12) United States Patent
Wickersham et al.

(10) Patent No.: US 11,538,094 B2
(45) Date of Patent: Dec. 27, 2022

(54) SYSTEMS AND METHODS FOR REAL-TIME ITEM IDENTIFICATION AND SOURCING

(71) Applicants: Jill Anne Wickersham, London (GB); James Pat Simmons, Jr., Belmont, CA (US)

(72) Inventors: Jill Anne Wickersham, London (GB); James Pat Simmons, Jr., Belmont, CA (US)

(73) Assignee: James Pat Simmons, Belmont, CA (US)

( * ) Notice: Subject to any disclaimer, the term of this patent is extended or adjusted under 35 U.S.C. 154(b) by 0 days.

(21) Appl. No.: 16/967,371

(22) PCT Filed: Feb. 6, 2019

(86) PCT No.: PCT/US2019/016933
§ 371 (c)(1),
(2) Date: Aug. 4, 2020

(87) PCT Pub. No.: WO2020/162935
PCT Pub. Date: Aug. 13, 2020

(65) Prior Publication Data
US 2021/0358021 A1 Nov. 18, 2021

Related U.S. Application Data

(60) Provisional application No. 62/627,009, filed on Feb. 6, 2018.

(51) Int. Cl.
*G06Q 30/06* (2012.01)
*G06Q 30/02* (2012.01)
(Continued)

(52) U.S. Cl.
CPC ......... *G06Q 30/0641* (2013.01); *A41D 1/002* (2013.01); *G06Q 30/0185* (2013.01);
(Continued)

(58) Field of Classification Search
None
See application file for complete search history.

(56) References Cited

U.S. PATENT DOCUMENTS

| | | | |
|---|---|---|---|
| 7,098,794 B2 * | 8/2006 | Lindsay | G06K 19/07345 340/572.3 |
| 7,979,030 B1 * | 7/2011 | Balardeta | A63B 57/00 455/66.1 |

(Continued)

FOREIGN PATENT DOCUMENTS

| | | | | |
|---|---|---|---|---|
| WO | WO-2007136657 A2 * | 11/2007 | | A61N 1/0504 |
| WO | WO-2014059032 A1 * | 4/2014 | | H01L 21/56 |

(Continued)

OTHER PUBLICATIONS

Di Rienzo et al., "Textile Technology for the Vital Signs Monitoring in Telemedicine and Extreme Environments," IEEE Transactions on Information Technology in Biomedicine, vol. 14, No. 3, pp. 711-717, May 2010. (Year: 2010).*

(Continued)

*Primary Examiner* — Nicholas D Rosen

(57) ABSTRACT

A device for transmitting real-time identification of a fashion item for receipt by a portable wireless computing device operated by a consumer located in a non-store location observing the fashion item, the device comprising: a Bluetooth fashion-item identification chip including: a fashion-item-use sensor; a processor operably connected to the fashion-item-use-sensor; a Bluetooth low energy transmitter operably linked to the processor; a battery operably connected to the fashion-item-use sensor, Bluetooth low energy transmitter, and the processor for providing power to operate the device; and a machine washable coating deposited around the periphery of the device for protecting the interior of the device from repeated exposure to water, heat, and chemicals utilized to maintain the fashion item. The device (Continued)

is utilized in the methods and systems of the invention for real-time identification of a fashion-item observed by a consumer in a non-store location and for real-time time purchase of the identified fashion-item via the consumer's portable electronic device.

29 Claims, 7 Drawing Sheets

(51) Int. Cl.
    *A41D 1/00*           (2018.01)
    *H04W 4/80*         (2018.01)
    *H04W 52/02*       (2009.01)
    *G06Q 30/00*       (2012.01)

(52) U.S. Cl.
    CPC ..... *G06Q 30/0226* (2013.01); *G06Q 30/0601* (2013.01); *G06Q 30/0623* (2013.01); *H04W 4/80* (2018.02); *H04W 52/0274* (2013.01)

(56) References Cited

U.S. PATENT DOCUMENTS

| | | | | |
|---|---|---|---|---|
| 8,269,835 | B2* | 9/2012 | Grigsby | A63B 71/0619 348/157 |
| 10,173,100 | B2* | 1/2019 | Sinha | H04N 21/2743 |
| 10,757,989 | B2* | 9/2020 | Nam | A41D 27/10 |
| 11,069,263 | B2* | 7/2021 | Dixon | G09F 3/02 |
| 2003/0147221 | A1* | 8/2003 | Blasko | H05K 7/026 361/736 |
| 2003/0177672 | A1* | 9/2003 | Lukas | C23C 14/028 38/93 |
| 2005/0155131 | A1* | 7/2005 | Underwood | B32B 5/022 2/85 |
| 2005/0242957 | A1* | 11/2005 | Lindsay | G06K 19/0716 343/893 |
| 2008/0137578 | A1* | 6/2008 | Goldberg | H04L 67/12 370/311 |
| 2009/0147025 | A1* | 6/2009 | Grigsby | H04N 21/2187 345/633 |
| 2013/0009786 | A1* | 1/2013 | Mosesov | A61N 1/37276 340/870.01 |
| 2013/0297422 | A1* | 11/2013 | Hunter | H04H 60/63 705/14.58 |
| 2014/0267586 | A1* | 9/2014 | Aguilar | H04N 5/2258 348/36 |
| 2014/0318699 | A1* | 10/2014 | Longinotti-Buitoni | H05K 1/038 156/247 |
| 2014/0355503 | A1* | 12/2014 | Kainulainen | G01S 5/12 370/311 |
| 2015/0063821 | A1* | 3/2015 | Mathews | H04B 10/2507 398/139 |
| 2015/0084785 | A1* | 3/2015 | Lesbirel | G01D 4/008 340/870.02 |
| 2016/0000374 | A1* | 1/2016 | Dandekar | A61B 90/98 600/587 |
| 2016/0012498 | A1* | 1/2016 | Prasad | G06Q 30/0185 705/26.1 |
| 2016/0038083 | A1* | 2/2016 | Ding | A61B 5/6804 600/388 |
| 2016/0111901 | A1* | 4/2016 | Waterford | G01R 31/382 29/831 |
| 2016/0242279 | A1* | 8/2016 | Jezewski | H05K 3/0058 |
| 2016/0327979 | A1* | 11/2016 | Lettow | H05B 3/145 |
| 2017/0340254 | A1* | 11/2017 | Davis | A61B 5/15087 |
| 2018/0001138 | A1* | 1/2018 | Sinha | G09B 19/0038 |
| 2018/0035726 | A1* | 2/2018 | Harkins | G07C 9/00309 |
| 2018/0122273 | A1* | 5/2018 | Dixon | G09F 3/0297 |
| 2019/0082753 | A9* | 3/2019 | Nam | A41D 27/24 |

FOREIGN PATENT DOCUMENTS

| | | | | |
|---|---|---|---|---|
| WO | WO-2017120367 A1 * | 7/2017 | ............. | A41D 1/002 |
| WO | WO-2018214450 A1 * | 11/2018 | ............. | C23C 16/455 |

OTHER PUBLICATIONS

Li, Y., et al., "Smart Sportswear," 2011 International Conference on Future Computer Science and Education, IEEE Xplore, Oct. 13, 2011. (Year: 2011).*
Farjadian, A.B., et al., "SQUID: Sensorized Shirt with Smartphone Interface for Exercise Monitoring and Home Rehabilitation," 2013 IEEE International Conference on Rehabilitation Robotics, (Year: 2013).*
Liang, T., et al., "Wearable Medical Monitoring Systems Based on Wireless Networks: A Review," IEEE Sensors Journal, vol. 16, No. 23, pp. 8186-8199, Dec. 1, 2016. (Year: 2016).*
International Search Reporton International Application No. PCT/US19/16933, dated Jul. 2, 2019. (Year: 2019).*
Written Opinion of the International Searching Authority on International Application No. PCT/US19/16933, dated Jul. 2, 2019. (Year: 2019).*

* cited by examiner

App Screen 1

App Screen 2 – "See Something You Like? Start Scanning "

App Screen 3 – "Shop The Look"

App Screen 4 – "We Found 2 Looks in Your Vicinity .. Please Choose "

App Screen 5 – "Scanning"

App Screen 6 – Information on Selected Item

App Screen 7 – "Thank You, Your Order 32752 Will Be Dispatched Now – Share And Earn Points"

SYSTEMS AND METHODS FOR REAL-TIME ITEM IDENTIFICATION AND SOURCING

This application is a continuation-in-part of U.S. Provisional Patent Application Ser. No. 62/627,009.

BACKGROUND

Field of the Invention: Disclosed is a mobile, e-commerce, hardware and software platform, incorporating the Internet of Things (IoT) and Big Data. The app and customized microchip technology allows consumers to buy fashion apparel and accessories that they see someone else wearing or after hours in a store window with their smartphone. It also allows brands to capitalize immediately on the consumer's impulse to buy when he or she first becomes interested, while simultaneously capturing a treasure trove of data analytics in the form of market research.

Background of the Invention: Major fashion brands' marketing methods are moving from PR, print, and television advertising to also include online web and mobile social media. Additionally, their primary sales channel is moving from physical retail stores to also include online web and mobile channels. However, despite the advantages of digital marketing and sales, significant problems remain. While online ads can be targeted more effectively than print or TV ads, debate remains about the effectiveness of web advertising; also, consumption of mobile is growing more rapidly than that of the internet. Comscore, Nielsen, and SEO companies offer good analytics on web ads, the mobile web does not support "cookies," eliminating the possibility of broad mobile ad analytics, other than tracking the number of app downloads. In the exceptionally visual world of fashion, Instagram and Pinterest are leading contenders for mobile advertising dollars. High-end fashion brands are spending 3% to 11% of revenues on advertising and promotion alone, yet it remains very difficult to confidently correlate advertising spent with direct consumer interest in a brand's specific style, color, fabric, size, or item, much less as a function of consumer demographics and location. These same brands, sporting gross margins in the 60%-70% range, are spending up to 30% or 40% of revenues on overall marketing and sales including the very substantial costs of building out, renovating, and maintaining physical stores where most of their sales still occur. Other retailers "are trying to get the user experience simple enough so people are willing to buy on their phones, not just use it as a research tool," according to eMarketer analyst Yory Wurmser.

The fashion consumer is smart. S/he or she knows that airbrushed photos of models in magazines, on TV, or on the web or smartphone are of limited benefit. Flipping through a magazine looking at airbrushed photos of celebrities just isn't the same as the real time experience. The consumer is also trying to learn about and buy apparel and accessories they see in a store or store window, or, better yet, being worn by another person, where all of their senses can be fully engaged.

Another example of consumers trying to learn about and buy apparel and accessories immediately is "See Now, Buy Now," a process in which a designer's new collection is not only presented on a fashion show runway, but also is streamed live through websites and social media. A Wall Street Journal article says "Perhaps no other innovation has garnered more attention in recent years" than this process (Wells, Wall Street Journal, Jan. 15, 2017). This may be part of an effort by brands such as Burberry, Tom Ford, Tommy Hilfiger, and Ralph Lauren to generate interest from customers who don't need more clothes. Achim Berg, who leads McKinsey's apparel, fashion, and luxury practice, says "How can you stimulate someone who has a lot anyway? You need to have a story, you need to have immediacy, you need to have an impulse" (Wells, Wall Street Journal).

A third example is the rise of visual search. Companies ranging from small startups (ASAP54, Snap Fashion, Style Eyes, Style Thief) to large firms (Amazon Firefly Phone app, Zalando, and Pinterest) are trying to use image recognition to allow women to "visually search" for apparel and accessories they want with their smartphone. However reviews of this technology are mixed. Firm CEOs are publicly admitting that "fashion from a technical perspective is very difficult for image recognition," and "you are not going to get it right 100% of the time." Mike Torres, an Amazon executive who works on the Firefly's software, said "Where things are rounded or don't have (visual markers) to latch on to, like a black shoe, it's a little harder to do image recognition."

In recent years, researchers have rechristened computer vision and image recognition as "Content-Based Multimedia Information Retrieval." A research survey paper entitled "Content-Based Multimedia Information Retrieval: State of the Art and Challenges," by Dr. Michael Lew, Director, Multimedia Research Group, Leiden University Institute of Advanced Computer Science et al, February 2006, states "the general problem (of Content-Based Multimedia Information Retrieval) remains largely unsolved." In recent years increased computation power has enabled some progress on this problem. However, actual results show that there is a very long way to go. The computational power of the human brain has been estimated at 30 times greater (IEEE Spectrum, Aug. 26, 2015) to as many as 14 orders of magnitude greater (or 100 trillion [100,000,000,000,000] times greater than today's most powerful supercomputers (Human Brain Project, retrieved Jan. 16, 2017) with some admitting that we don't know since we know so little about the brain. Since the human eye and brain find it difficult to differentiate, for example, a Hermes handbag from a counterfeit bag at a distance of 15-20 feet, it is possible that it will take computer vision on a smartphone many years or even decades to be able to do this.

"The Hitchhikers' Guide to iBeacon Hardware/A Comprehensive Report by Aislelabs dated May 4, 2015 examines 26 different iBeacon hardware vendors. This report shows that none of the 26 suppliers uses a battery smaller than 20 mm in diameter (0.79 inches), making the device diameter at over 1 inch generally too large to be embedded into apparel and accessories. Several of the 26 use even larger batteries, making the device proportionately larger. Also the printed circuit board (PCB) assembly used in at least one of these units is larger than the battery despite apparently using recent advances in semiconductor packages perhaps including WLCSP (Wafer Level Chip Scale Package). The large PCB assembly further increases the overall device size. In addition, default parameters in some cases are optimized for the "push" retail application. And in some products unnecessary additional functionality is added, degrading all-important battery life. Also, these suppliers offer very limited ability to customize or program their hardware, for example to set transmit power and time, time in sleep mode, and other parameters very important for maximizing battery life.

Finally, none of the 26 are definitively specified as capable of long term operability after being machine or hand washed, dried, laundered, and ironed. These operations involve temperatures of up to 250 degrees C. and being submerged in water or other liquids for 30 to 40 minutes.

Batteries are particularly sensitive to water, heat and other stresses; coin cell batteries used in many of the 26 iBeacons (and by necessity, all of the smaller ones) are made of Lithium, which is highly reactive and flammable. If a Lithium battery is short circuited it can discharge very rapidly leading to overheating and possible explosion in a process called thermal runaway (Bro, Per & Levy, Samuel C. (1994). *Battery hazards and accident prevention*. New York: Plenum Press. pp. 15-16. ISBN 978-0-306-44758-7). As a result Panasonic and other battery suppliers use welding to attach tabs to batteries rather than soldering them. "Washing Wearable Electronics Adafruit Learning System" states "First, and always: remove the batteries! . . . your batteries should never be bent, shorted, or be subject to water or heat." Of course, removing batteries from a small microelectronic device permanently embedded into apparel or accessories is difficult if not impossible to do without damaging the apparel or accessory item. Of the 26 suppliers only BKON (weather-resistant, 60×26.5×18.75 mm, operating temperature −20 to +80 degrees C.), Estimote (splashproof, 55×38×18 mm, operating temperature 0 to 60 degrees C.), Gelo (water proof, submergeable in water, no specifications available; the company no longer appears to be operating), Minew (E6 Beacon is smallest promoted as weather proof but no mention of water or weather or operating temperature on data sheet, 42.5×23.5×5.3 mm) are mentioned as weather or water capable and all are too big and still do not appear capable of handling 250 degrees C. The conventional solution to such challenging environments would be to add a large, thick, sealed enclosure, further adding to size and weight. The RadBeaconDot by Radius Networks used by the company for prototyping is specified to operate from −10 to +65 degrees C. and has a replaceable battery. Water resistance is not mentioned. Indeed the cover opens to allow the battery to be replaced, meaning that the unprotected battery will be submerged in water for 30 or more minutes during machine washing. There is no doubt that the RadBeaconDot with its battery will not endure washing, drying, laundering, and ironing.

In short, none of the 26 are usable for consumer "pull" applications and all have problems with the size, high temperature, water submersion, battery life, and other requirements for our application.

"A Guide to Selecting a Bluetooth Device Chipset" by Argenox dated May 19, 2016 lists several available Bluetooth chipsets and devices. Of the seven which specify current drawn while transmitting, the lowest current drawn is 4.9 milliamps by the Dialog Semiconductor DA14580. Transmit current is a key factor limiting battery life for Eye BeamIt's application.

Another option is embedding passive RFID (Radio Frequency Identification) tags into apparel or accessories. Passive RFID tags do not use troublesome batteries but vary and reflect the RF waves or signals they receive back to the reader (backscattering, a form of energy harvesting) (Impinj, RFID Link Budget White Paper, May 7, 2015). However, RFID systems also require an RFID Reader (wikipedia article on Radio Frequency Identification retrieved Feb. 6, 2018; Types of RFID, Cal Poly San Luis Obispo PolyGAIT, 2012; RFID Journal Frequently Asked Questions, retrieved Feb. 6, 2018). In this case, the Reader would have to be either attached to the smartphone or be incorporated into the smartphone.

RFID systems use one of two types of coupling or connection:

Inductive coupling, a type of shorter-range ("near field") interaction, to transmit and receive information. Here the inductor coils serve as the antenna, similar to the coils of a transformer (Wikipedia article on Inductive Coupling, retrieved Feb. 6, 2018). Range for these inductively-coupled tags is roughly comparable to the size of the reader antenna (Wikipedia article, Near and Far Field, retrieved Feb. 6, 2018). Thus, small readers have a range of a few centimeters or a few inches, and a large reader with a large antenna can have a range of a meter (about 3 feet). NFC (Near Field Communication) operates at 13.56 Megahertz, one of the common inductive coupling frequencies. NFC also includes a "full stack" of higher level protocols (Wikipedia article, Near field communication, retrieved Feb. 6, 2018). In other words, NFC is a full set of protocols including not only the bottom physical layer (RF wireless receive and transmit hardware), but also higher-level software protocols needed for the reader and tag to reliably and fully communicate. So NFC is a specialized subset of RFID. Most if not all new iPhones and Android phones today have built-in NFC readers for Apple Pay, Samsung Pay, and other applications. However, these NFC readers are the only known RFID readers built-in to smartphones today. NFC has a short range—theoretically up to 7.9 inches (20 cm) but actually in practice less than 1.6 inches (4 cm) (Wikipedia article, Near field communication; NearFieldCommunication.org, retrieved Feb. 6, 2018; What Is NFC, TechRadar, May 9, 2017; Gigaom, With iBeacon, Apple is going to dump on NFC and embrace internet of things, Sep. 10, 2013). Clearly NFC's short range has limited usefulness.

Radiative Coupling, where radio waves are launched using monopole or dipole antennas. UHF (Ultra High Frequency)—860 to 960 MHz, now known as the EPC Gen 2 band has a wavelength is about 13 inches (33 cm) (Cal Poly SLO, PolyGAIT). Depending on the size and power of the reader and the size of the tag (and its antenna), ranges can be a few inches (for the smallest tags) to over 115 feet (for some of the biggest passive tags) (Guide to RFID Readers, Atlas RFID Store, retrieved Aug. 20, 2017). This is the RFID technology that could be applicable to our application. However, no known smartphones with the built-in UHF RFID readers needed for 30 foot range are available today. Impinj's SEC S-1 filing states that the company believes it has a 65% share of the worldwide market for passive UHF RFID chips. The company says it "believes it is the market leader in Gen 2 EPC tag chips." And Impinj says "no cell phone has UHF Gen 2 RFID built in other than NFC," and while they don't know what additional battery capacity in the cell phone would be needed to power this reader, "it would take power." (Personal conversation with Impinj, Aug. 18, 2017). Mark Roberti, Director, RFID Journal, states "I believe consumers also will need a passive UHF RFID reader in their mobile phone, in order to be able to read tags on products and obtain pricing and other information. This will not happen quickly—but I believe it will happen" ("Next Up: a Passive RFID Reader in Your Phone," RFID Journal, Mark Roberti, Sep. 22, 2014). Also, it is not clear that a Gen 2 UHF RFID reader eventually built into a smartphone would provide a 30-foot range for the disclosed technology, given the consumer and brands' need for tags of 0.5 inch or less. Impinj, the market leader in passive UHF RFID tags, says (Personal conversation with Impinj, Aug. 18, 2017):

A typical tag for a 30-foot range is the size of a business card. A smaller tag does make range worse. 30 feet is best case for passive RFID with no interference. If the tag is on the person's body, the body will absorb a lot of energy, reducing range. A wristband is a challenge; you need space so that the tag is not in direct contact. 15 feet would be easier. 30 feet is at the very outer limit—a stretch. 37 feet is tough—a theoretical number. Polarity is an issue—the tag must be oriented right. The edge or the side does not have as much surface area, reducing range. People move. Read rates will be lower. If you need a tag less than 1 inch, range would be 2 feet. A tag of 0.3 inches with range of 30 feet would be really tough. Tags are antenna limited.

Some "Add-On" Gen 2 UHF RFID readers which work with smartphones are available or are expected to be announced although size, range, cost, and/or other issues are not clear:

U Grok It advertises an add-on reader for smartphones that is 6×3.75×1.5 inches and connects with iPhones and Android phones by a cable. Range is quoted as 6 to 25 feet. It is priced at $500 to $550. The supplier says "as a general rule, the larger the tag, the further away it can be read" (U Grok It RFID Reader for Smartphones, Amazon, retrieved Aug. 21, 2017; U Grok It Releases UHF RFID Reader for Phones, Tablets, RFID Journal, Sep. 29, 2014).

SkyRFID advertises its 860-960 MHz Gen 2 Cell Phone or Table Reader or Writer. It plugs into cell phones and is 1.7×1.9×0.6 inches. It is currently available at a Weekly Special price of $350. SkyRFID has not yet provided price quotations in volume, but the product spec sheet shows a range of only "up to 20 inches (50 cm)" (SkyRFID Weekly Special, retrieved Aug. 16, 2017; personal email from Cara, SkyRFID).

RFID ME offers its MINI ME Gen 2 EPC UHF RFID Reader. It also plugs into Android cell phones and is 1.5×1.3×0.6 inches and is priced on Amazon at $199. But its range is described as "2 to 20 inches (5 to 50 cm) depending on tag and environment "and also as" up to 10 inches (25 cm), may be less depending on tag and environment." Finally, it states "MINI ME is convenient to use where mobile UHF RFID reading of EPC Gen 2 tags at close range is acceptable." (RFID ME Android Powered Devices, Amazon, retrieved Aug. 16, 2017).

Impinj, a leading supplier of readers and also reader and passive tag chips, says a Moto z phone RFID attachment is in test phase now and may be coming to market as part of the "expandable phone" idea. It is expected in the future. But it will not be a built-in reader; it will be an add-on (Personal conversation with Impinj, Aug. 18, 2017).

Persuading consumers to buy add-on readers, and plug them in and get them to work with their smartphone is a challenge. Even if the technical and economic issues were addressed, the idea of fashion consumers on the street buying and plugging in these add-on devices, downloading the app, and getting all of it to work on their own is a very big problem.

A number of other technology options that do not depend on batteries are still in basic research or development. These include energy harvesting with twistrons using Carbon Nanotubes (CNTs) per the University of Texas at Dallas; graphene-based harvesting; backscatter based harvesting per University of Washington; and other nanomaterials-based energy technologies. Other non-battery energy storage technologies which have not been widely commercialized except when subsidized include fuel cells and supercapacitors.

Rechargeable batteries using new, non-Lithium Ion materials and next generation Lithium Ion rechargeable batteries are also theoretical options, but are still in research and/or are being attempted by high risk, early stage startups.

Why Batteries, Despite their Problems, are so Widely Used

Market studies estimate that spending on batteries for electronic devices and cars will be $47.5 Billion by 2020 (Why Does My Battery Suck, Sherr et al, CNET, Dec. 4, 2015). This dwarfs spending on alternatives such as fuel cells ($1 Billion), supercapacitors ($400 Million), and graphene ($9 Million). Apple, Samsung, HP, and other suppliers of smartphones, laptops, all use batteries. Tesla uses batteries for their cars. If there were other good options, these innovative and deep-pocketed companies have plenty of motivation to deploy them, but they have not or have failed in attempts to do so (Samsung). Despite their problems, batteries are still found to be better than other alternatives as shown above. After failing in fuel cells, Samsung is investing heavily in batteries with a goal of becoming the world's top battery supplier by 2020 (Korea Times, Apr. 12, 2016). Apple is reportedly working with China's largest battery supplier (Apple is reportedly working on electric car batteries wihc China's largest battery maker, Lambert, 9to5Mac, Jul. 20, 2017). And as one observer says, Apple has designed its laptops as "essentially, giant battery packs" and that "iOS devices are already giant battery packs." In other words, Apple understands that they will be using batteries for a long time and have made major investments to optimize their products around this fundamental limitation. Tom Murphy, Associate Professor, Physics, UC San Diego, says, "Despite their lackluster performance next to fossil fuel storage, batteries still beat the pants off of mechanical or gravitational storage" (Battery performance deficit disorder, Do The Math, Murphy, Aug. 21, 2012).

Meanwhile, the fashion consumer's drive to find and buy the fashion item he or she wants remains unsatisfied. A reliable source witnessed Kim Kardashian sitting in a high-end restaurant for 90 minutes looking at numerous fashion items worn by other women in the restaurant. She then took photos of those items and told her personal assistant "I want that," ordering her to go find and buy them. Another woman without Kardashian's resources spent two weeks looking for a dress that she had seen another person wearing. Actress Kate Bosworth has announced that her image search app, Style Thief, will allow women to "snap and steal" their perfect apparel or accessory worn by another woman. This app uses image recognition (i.e. not 100% accurate) and does not allow the customer to instantly buy the item they want. Many visual search startups have tried to address this problem using photos but have been unsuccessful; new data shows why. Multiple smartphone photos of 24 apparel or accessory items were taken at distances of two to thirty feet. The photos were fed into two leading visual search apps—Google Lens Style Match and ScreenShop, for which Kim Kardashian West serves as advisor. These apps were found to identify the same item independently in zero [0] out of 935 attempts. There may be some physics challenges for visual search software. One source stated that smartphones have already reached the limit of the number of pixels they can reasonably put in their camera chips. It says that a 2012 Nokia phone with 41 megapixels had some of these issues and that 12-16 megapixel sensors are likely to be standard for the foreseeable future (Why haven't we seen another 41-megapixel smartphone camera?, Android Authority, Nov. 13, 2017). Another says performance is "more and more limited by the number of photons" collected (How much more can smartphone cameras improve?, Quora, Jeff Forbes, Apr. 22, 2016). In the extreme case of only one photon of light collected by one pixel, one can see that image quality is a problem that software is unlikely to be able to address in the foreseeable future.

Actress Kate Bosworth does, however, have the right idea, citing that "everyone has fashion envy and can relate to that feeling of looking at an editorial or a friend, or the runway, for that matter and wanting to steal something exactly as you're seeing it, or something similar". She's not alone; Dr. Stephen Reiss, a distinguished Professor Emeritus of Psychology at Ohio State, found that "romance, the desire for sex and beauty" is one of the sixteen basic human desires. We all want to feel desirable and sexy!

Clothing resale is a burgeoning industry. Consigning undesired clothing is an excellent way to turn over a wardrobe and is becoming increasingly popular as a way to find vintage and unique apparel. However currently the owner must turn over items for a potential sale limiting access before return. Additionally, these secondhand items can't be seen in application and much of the resale value covers costly storefront maintenance. Currently consumers must either trust online descriptions of consigned items or buy in stores with costly overhead while the seller must relinquish usable clothing without guarantee of resale and for limited profits.

In addition, security is widely considered to be a serious concern with Internet of Things (IoT). Even in the case of laptop computers, widely used for 30 years, software encryption leaves the computer and its data vulnerable to an attack. Videos by LucidPort Technology, Inc. and Princeton University show that an attacker can in a few minutes get past Microsoft BitLocker, a leading software encryption technology included in high end versions of Microsoft Windows.

What is needed are systems and methods for consumer identification of a targeted item real-time. What is also needed are systems, devices, and methods which facilitate a consumer engaging with a product or a brand only when the consumer wants to engage with the targeted item. Additionally, what is needed are systems, devices, and methods which facilitate real-time identification of products and/or brands.

SUMMARY

Disclosed are systems and methods for consumer identification of a targeted item. By embedding wireless chip-based devices incorporating Bluetooth Low Energy (aka Bluetooth LE, BLE, Bluetooth Smart, Bluetooth 4.0 LE, Bluetooth 5, Wibree, or "BLE"), Bluetooth Classic, and equivalent wireless technologies, into an item (e.g., apparel or accessory) which a consumer interacts with on the street, in store windows, in stores, at fashion shows, and in other non-store locations, consumers can get information on these items and buy them within seconds. These devices, when used with the app on the consumer's smartphone will allow the consumer to identify, learn about and buy the item she wants quickly and much more accurately than will computer vision/visual search. Brands and retailers will be able to immediately capitalize on consumers' impulse to buy.

Using BLE not for "push," but for "pull": BLE is designed to send messages to consumers nearby in retail stores ("push"). We claim using BLE to allow consumers to choose what they are interested in and what they want to buy ("pull").

Designing the device to automatically go into sleep mode after a short programmable amount of time without motion (using a programmable or non-programmable motion sensor) and/or with minimal light (using a programmable or non-programmable light detector) and/or other method to determine when a garment or accessory is in a closet. This will maximize battery life.

While in wake mode, the device will turn itself on for a very short period of time every second (between 0.5 and 50 milliseconds; probably 1 to 3 milliseconds) and transmit its unique signal to consumer smartphones, resulting in a very low duty cycle, maximizing battery life.

These devices embedded into apparel and accessories will transmit a unique multiple-digit number associated in the retailer's/brand's database with the exact vendor, style, size, color, fabric, size and other available item-specific information. A BLE packet transmitting in an Advertising Channel includes a payload of between 0 and 37 bytes or between 0 and 296 bits. Even the longest payload will be transmitted within less than 300 milliseconds (Introduction to Bluetooth Low Energy-Part I, Z-Focus Consulting, Jul. 14, 2011). Thirty bits can represent about 1 billion numbers (Introduction to Computers, Brandeis University, CS2a, Sep. 6, 2001). Per McKinsey 2016, 100 billion garments were produced in 2014 and growth continues (Remy, Style that's sustainable: a new fast fashion formula, McKinsey. Since there are a minimum of several hundred fashion brands and thus users of these devices, the number of apparel and accessory items sold per year per brand has to be less than 100 billion for decades to come. As a result, the unique number for each item will include 37 bits to identify the garments or accessories sold by each company (representing 100 billion garments or accessories sold per year), another 20 bits to identify each company (representing 1 million companies, which is more than enough), and 7 bits to represent the year the item was produced (representing 124 years). This is a total of 64 bits, much more than is needed, but far less than the 296 bits included in the payload of a BLE packet.

To minimize device height and manufacturing cost, and battery reliability, before Parylene HT or equivalent deposition, solder tabs (shown in FIG. 3) approximately 4 mm wide and 0.15 mm thick will be used to press fit into the printed circuit board and will be spot or laser welded onto the battery terminal. Solder used will be flux free so that there will be no outgassing during parylene deposition.

These embedded devices will have an approximately 25 micron thick Parylene HT or equivalent conformal coating designed to withstand machine washing, machine drying, laundering, and dry cleaning. Parylene HT, the newest, most advanced known formulation of Parylene, has been demonstrated to survive continuous exposure to air at 350 degrees C. with 24 hour excursions to 450 degrees C., and absorbs less than 0.01% water after 24 hours per ASTMD570. Circuit boards coated with Parylene HT showed no corrosion or salt deposits after 144 hours of salt-fog exposure per ASTM B 117 during tests by an independent test facility (SCS Coatings Technical Library, retrieved Jan. 31, 2018). With a molecular size of 8 nanometers and a deposition process which grows a molecule at a time (SCS, retrieved Jan. 31, 2018, Parylene fills extremely small crevices successfully), Parylene fills extremely small crevices successfully. Very importantly, Parylene HT not only solves the washing and ironing problem but also does this without adding a large, thick enclosure, making it possible to have an embedded device both rugged and very small. Although the poly (p-xylene) polymer, Parylene HT, is the preferred coating resin for vapor deposition of the BLE wireless chip, other poly (p-xylene) polymers may be utilized for providing a protective coating over the chip.

Architecture for Combining IoT Embedded Wireless Devices and Large Scale Data Analysis (Big Data/Data Mining) Specifically for Fashion and or Apparel and Accessory (see FIGS. 1A-B).

Brands and or Retailers will have a database of specific item data (vendor, style, size, color, fabric, size and other item specific information), specific consumer purchaser data (name, street address, phone number, social security number, driver license number, email address, debit and credit card number, bank account numbers, and other information already provided to the brand or retailer); demographic data (age, gender, ethnicity, income range, home zip code, education if available, and similar information), and geo-location and time data relating to the consumer including when and where she saw the item, when and where she bought the item, when and where she retrieved information on the item and related information.

The company's database will include relevant information in the brand or retailer's database except that it will have very limited specific consumer data due to the anonymization process. However, the database will have anonymized consumer data from all the brands and retailer's with whom it does business, resulting in a treasure trove of information on consumer behavior.

Note that while the brand and/or retailer's database will include all personal consumer information it has already acquired, the company's database will be anonymized and will specifically exclude personal consumer data including name, street address, phone number, social security number, driver license number, email address, debit and credit card number, bank account numbers, passport number, and other data which would allow the person to be specifically identified.

As multiple brands launch worldwide incorporating the disclosed technology in their apparel and accessories, an electronic marketplace for fashion apparel and accessories will be created, somewhat similar to Apple's App Store but targeted at fashion-conscious women and men. Marketplace participants will have the opportunity to collect rewards for frequent usage.

Devices can be configured to use NSA-Level AES-256 Encryption in the Microelectronic Devices Embedded into Apparel and Accessories. This optional higher end microelectronic device, including BLE or equivalent, embedded into apparel and accessory items on the street, in store windows, in stores, at fashion shows, and other non-store locations will allow consumers to get information on and immediately and impulsively buy—AND will allow store owners, consumers, and law enforcement authorities such as customs agents to differentiate legitimate apparel and accessories from counterfeit and/or knock-off apparel and accessories. This high-end technology will use two-way communication between the embedded microelectronic device and the consumer smartphone or other processor. Both transmit and receive capability will be incorporated in this optional higher end embedded microelectronic device.

First the optional higher end device and receiver will negotiate an encryption key for each device-receiver session using AES-512, AES-256, AES-128, AES-64, AES-32, RSA, or equivalent security protocol.

From here on, both the basic transmit-only device and the higher end transmit-and-receive device will function in exactly the same way. The embedded device will transmit its unique many-digit number associated in the brand and/or retailer database with the exact vendor, style, size, color, fabric, size and other item specific information; purchaser information including name, street address, phone number, social security number, driver license number, email address, debit and credit card number, bank account numbers, and other information already provided to the brand or retailer; demographic information (age, gender, ethnicity, income range, home zip code, education if available, and similar information); and geo-location and time data relating to the consumer including when and where she saw the item, when and where she bought the item, when and where she retrieved information on the item and related information. The company's database will get all of the above information, but specifically excluding private purchaser information including street address, phone number, social security number, driver license number, email address, debit and credit card number, and bank account numbers.

If the transmitted unique number matches the correct validated number in the brand and or retailer database and/or the company's database, the consumer will also receive acknowledgement through the app on her smartphone from the company and/or brand and/or retailer server that the associated apparel or accessory item is legitimate. If the item is counterfeit or otherwise illegitimate, the consumer will also be notified through the app. In addition, a pre-designated person within the brand and retailer (for example the chief security officer) will be notified of the detection of the illegitimate item so that they can take appropriate legal action.

A consumer may wish to turn off the higher-end embedded device transmit signal at times for privacy. At those times, she would want assurance that others would not be able to detect signals from her clothing. To meet this need, NSA-Level AES-256 Encryption in Embedded Microelectronic Devices, the system can incorporate a simple command in its smartphone app which will allow the consumer to turn off one or more transmit signals from devices embedded into apparel and accessories she is wearing.

Additionally, in some configurations Wireless and Computer Vision/Visual Search for the Fashion Vertical Market can be combined. As computing power increases and more experience is gained with computer vision algorithms, incorporating such algorithms in its smartphone app for gross, basic tasks will further improve accuracy and performance of the app. For example, in a very crowded area with many consumers wearing enabled apparel and accessories, visual search could help to narrow the possible options to be displayed to the consumer.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
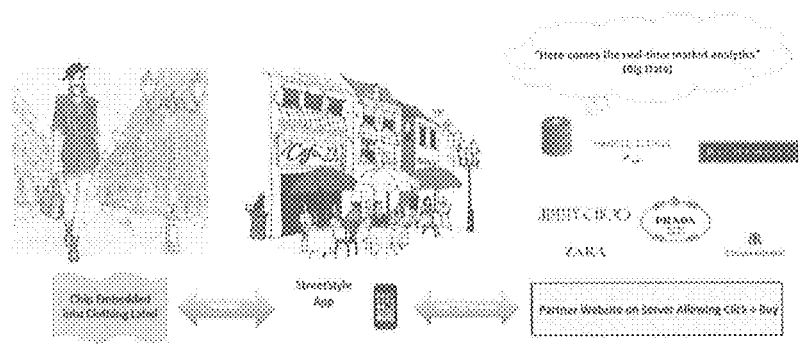
FIGS. 1A-B are a high level overview of the system for consumer identification of a targeted item.
Figure 1B:
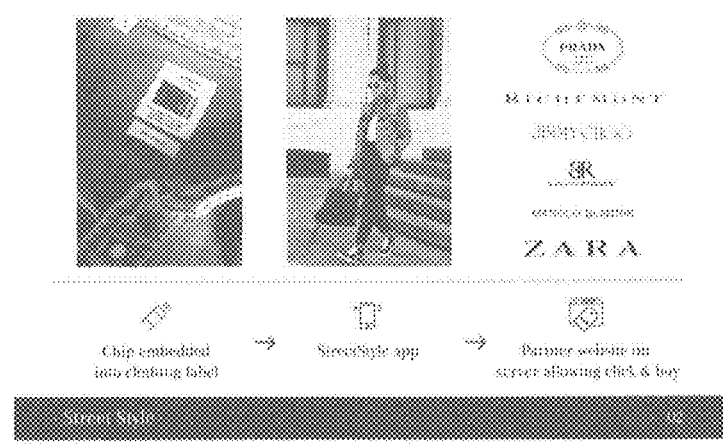
Figure 2A:
FIGS. 2A-G are screen shots of a user interface for a system which allows consumer identification of a targeted item.
Figure 2B:
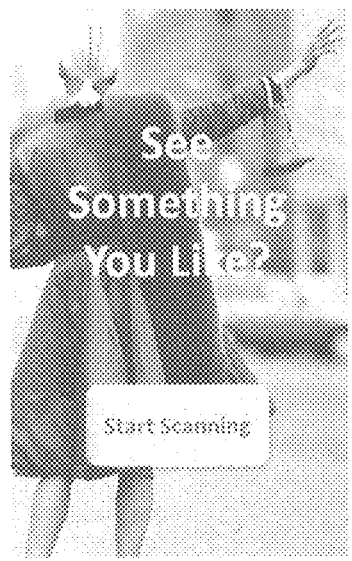
Figure 2C:
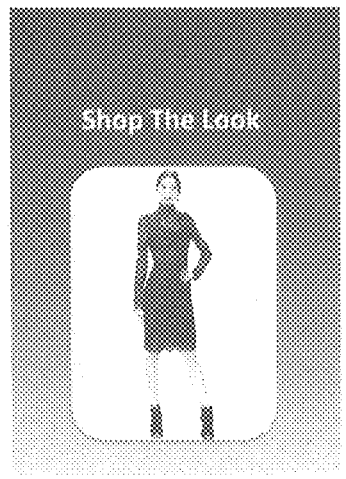
Figure 2D:
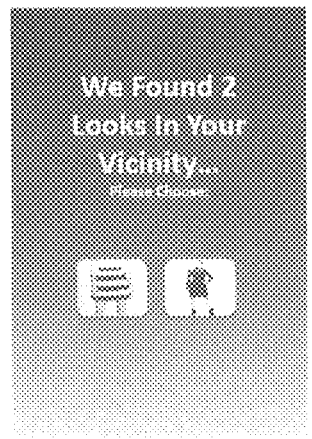
Figure 2E:
Figure 2F:
Figure 2G:
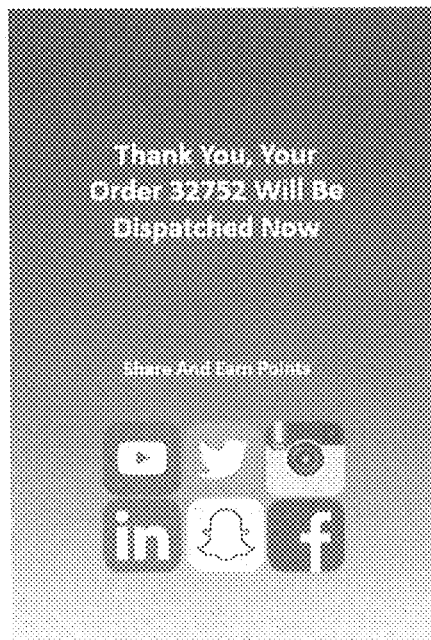
Figure 3:
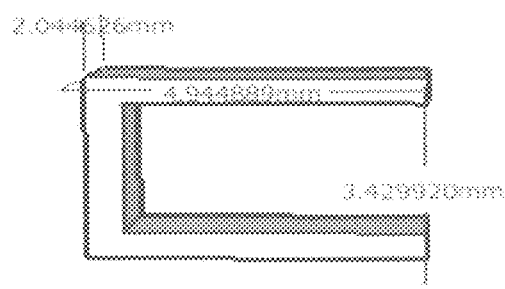
FIG. 3 illustrates a side view of a solder tab and printed circuit board utilized in accordance with one of the preferred embodiments of the microelectronic device of the invention.

Disclosed is a small wireless microelectronic device to fashion retailers and brands to be embedded into the apparel and accessory items. A CR927 or other similar coin cell battery (shown in FIG. 3) is mounted on top of a printed circuit board with processor and motion sensor chips embedded between layers of the board (shown in grey in the drawing). Solder tabs (shown in FIG. 3) are spot welded to the battery terminals and are press fit and soldered to the appropriate PC board trace. The microelectronic device communicates with an app allowing the consumer to get information and buy a fashion item he or she sees on the street, café, club—or anywhere. Using a smartphone, the consumer will be able to wirelessly and simultaneously connect with the system-enabled item as well as the brand's website. In addition, information and data gathered is stored in a scalable, high performance database to provide analysis to the brands, thereby capitalizing on the treasure trove of valuable demographic and real-time data. The wireless BLE product identification chips in accordance with the various embodiments of the invention are intended for use with a variety of fashion items. The term "fashion-item" as used in this application means any item of apparel as well as certain accessories of sufficient value and having sufficient size for the wireless BLE identification chip to be unobtrusively mounted on or within the accessory. For purposes of this application, the accessories within the definition of "fashion item" include at least boots, shoes, ties, hat, gloves, shawls, scarves, hand bags, and wallets. Small jewelry items, stockings, and watches are excluded from the definition of "fashion-item" for purposes of this application. An overview of the operation of the microelectronic device and app is illustrated in FIGS. 1A-B.

Key Device Design Considerations. Brands want the device embedded into the apparel or accessory to be virtually invisible, so it must be very small—well under 0.5 inch (12.5 mm) in diameter. However, the smallest 3 volt lithium button coin cell batteries are the CR927 (9 mm diameter) and CR1025 (10 mm diameter), one of which will be used. These batteries are half the diameter of the CR2032 coin cell batteries used in many iBeacon devices. Their battery life is only 27 and 30 mA-hours, respectively, about 7× less than the CR2032. Our device must have a battery life of at least five years, meaning that reducing the amount of battery current drawn and reducing the amount of time processors are on is paramount.

The device lifetime can be divided into three zones: 1) On Zone—When the device is transmitting, which lasts about 1 millisecond during each Bluetooth Advertising Interval of 100 milliseconds to 2,000 milliseconds over a six hour period; 2) Off Zone—When the device is on but not transmitting (the remainder of the 100 millisecond to 2,000 millisecond Advertising Interval) over the six hour period); and 3) Hibernation Zone—When the device is in sleep mode or is off, which lasts for one week to as much as 90 days or more.

During the On Zone, the device processor radio frequency transmit power should be 0 dBm (1 milliwatt) or slightly more to achieve a range of 25 feet or more. This will result in current of 3 to 4 milliamps being drawn by the processor. For example, the Microchip ATBTLC1000A-UU-T data sheet specifies a transmit current of 3.0 milliamps at VBATT (Battery Voltage) of 3.6 volts for output power of 0 dBm. Page 50 of this data sheet shows advertising current measurements at VBATT and VDDIO (IO External Supply Voltage) of 3.3 volts. Current drawn from other device components will be small compared to the processor that is transmitting, so the total device current drawn here will be 3 to 4 milliamps.

Of the ten BLE processors found (eight from "A Guide to Selecting a Bluetooth Device Chipset" by Argenox dated May 19, 2016, plus the Toshiba TC3567C and the Microchip ATBTLC1000-UU-T), the Microchip processor has the lowest transmit current—3.0 mA at 3.6 volts. The examplar embodiment will use the ATBTLC1000-UU-T.

During the Off Zone, the device processor will be in a low power mode such as Power Down; Standby; Ultra Low Power Standby; Ultra Low Power with 8 KB retention, BLE timer, no RTC; Ultra Low Power with 8 KB retention, BLE timer, with RTC; or similar state, resulting in no radio frequency power being transmitted and approximately 0.5 to 1.5 microamps being drawn by the processor. Current drawn by the other device components will be small compared to the processor, so the total device current drawn here will be 0.5 to 1.5 microamps.

An important determinant of battery life and user satisfaction is Advertising Interval which the Bluetooth Special Interest Group defines as how often the device transmits or broadcasts (Wooley, Advertising Works Pt 1, Bluetooth Blog, Feb. 2, 2016). While Google's Android OS has a laissez faire approach, Apple has very specific guidelines to optimize user satisfaction for its iOS smartphones. It states that if a device uses Advertising Intervals longer than 20 milliseconds the following "specific intervals are to be used exactly": 546.25 milliseconds, 760 milliseconds, 852.5 milliseconds, 1022.5 milliseconds and 1285 milliseconds (Bluetooth Accessory Design Guidelines for Apple Accessory Products for Developers, Release R8; Technical Q&A 1931, Aug. 15, 2016). Apple warns that "even the slightest deviation from these actual intervals may dramatically increase your time to discovery" by the iPhone, leading to user dissatisfaction.

The exemplar embodiment will use Advertising Intervals of 760 milliseconds, 852.5 milliseconds, and/or 1022.5 milliseconds.

During the Hibernation Zone, the device processor is configurable to be in deep sleep or shutdown (resulting in approximately 100 nanoamps of current being drawn) or, most likely, turned completely off (resulting in no current being drawn). In both cases no radio frequency power will be transmitted. Also in both cases, the motion sensor will be in ultra low power, sniff or similar mode drawing an additional 20 to 400 nanoamps of current. No other device components will be drawing power, so the total device current drawn here will be at most 400 to 500 nanoamps and likely between 20 and 45 nanoamps.

Of 24 motion sensors or accelerometers from seven vendors (Analog Devices, Bosch, Kionix, mCube, NXP, Silicon Designs, and ST Microelectronics) identified for this application, the lowest specified power current for the device waiting to be awakened, labeled variously as lowest operating current, deep suspend mode current, standby current, sniff current, ultra low power current or equivalent mode current drawn is specified in data sheets as 400 nanoamps to 21 milliamps (or 21 million nanoamps), leading to dramatically negative battery life impact.

However NXP was also found to offer the MMA8491Q Motion Sensor which is specified to have extreme low power current of 400 nanoamps per Hertz. Substantial research showed that this digital accelerometer, a Micro Electro-Mechanical Sensor (MEMS) unit can be configured to operate at broadly variable sampling intervals and resulting Output Data Rates (ODRs). NXP application note AN4999 shows that for a 10 second sampling interval (0.1 Hertz ODR), the average current drawn, called extreme low power current, is 41 to 45 nanoamps with a with a 100 nanofarad (0.1 microfarad) bypass capacitor as shown in section 8 of the MMA8491Q data sheet. Also section 12.3 of this data sheet shows sample intervals could be greater than 30 seconds and that in that case, the MMA8491Q can be powered down to further conserve battery life. From FIG. 7 of AN4999, it appears very reasonable that with a 10 to 30 second sample interval, average current drawn of 20-25 nanoamps would be achieved.

The exemplar embodiment will use the NXP MIA8491Q Motion Sensor with a 100 nanofarad bypass capacitor in the tilt sensing mode with 10 to 30 second sample intervals or more.

The MMA8491Q operates at 1.95-3.6 volts. In the most power efficient tilt sensing mode, 1.95 volts are required to begin the sensing process and both one-shot supply current and shutdown current are specified at 2.8 volts. So operating at 2.8 v in the Hibernation Zone appears to be the point giving the best results from the MMA8491. Operating at 2.5 v, also seems very reasonable. Linear interpolation estimates get the average advertising current at 1 channel to 3.9 uA, which is acceptable. During prototype testing we will evaluate the how best to vary operating voltage impact on discoverability of using only 1 channel instead of 2 or 3, feasibility of operating MMA8491Q at 20 second and 30 second (0.05 and 0.03 Hz, respectively; based on FIG. 7, page 8 of AN4999, at 0.3 Hz, which they refer to as an operating regime that is practical, average current potentially could be reduced from 45 nA to 20 nA. In fact page 12 of the MMA8491Q data sheet states "For applications where sampling intervals are greater than 30 seconds, the host can shut off the tilt sensor power after acquisition of tilt sensor output data to conserve energy and prolong battery life."

Operating voltage will be to programmed to vary between the On/Off Zones and the Hibernation Zones. In the former, the operating voltage will be optimized for lowest transmit current, perhaps at 3.6 volts where transmit current is specified at 3.0 mA, at 3.3 volts where average advertising current has been measured, or other voltage between 2.5 and 3.6 volts. In the Hibernation Zone, operating voltage will be lowered to 2.2 to 2.8 volts to minimize motion sensor average sleep current. In addition the processor will be programmed to automatically modify other operating conditions in each of the three zones to achieve optimal battery life, consumer discoverability by smartphone from Apple, Samsung, and other suppliers.

The battery life resulting from the above embodiment will be five to 10 years depending on the size, frequency of use, market segment and other variables.

An embodiment of the wireless microelectronic device embedded into apparel and accessory items can include one or two CR927, CR1025, SR712SW, or SR512SW lithium button cell batteries or equivalent, a wireless transmitter chip or semiconductor device such as the ATBTLC1000 which transmits a signal using Bluetooth Low Energy (BLE) or similar protocol, an ultra-low power motion sensor such as the MM8491Q, a small printed circuit board (PCB) with an antenna embedded into the board, an ultra-low power PIC12(L)F1572 8 bit-microcontroller or equivalent, potentially a semi-custom processor, other associated resistors, capacitors, inductors or other electronic elements, appropriate mechanical parts, and miscellaneous other components. To insure that the PCB assembly does not impose a lower limit on overall device size, a new System in Package (SIP) manufacturing technology, SESUB (Semiconductor Embedded in SUBstrate), from TDK or equivalent will be used. The SESUB or equivalent process provider will buy semiconductor processors and perhaps motion sensors in wafer form rather than WLCSP (Wafer Level Chip Scale Package) chips, today's smallest packaged integrated circuits, along with all other elements of the Bill of Material (BOM), cut the wafers into die, and embed one or more chips between layers of a 2 or 4 layer PCB. SESUB solutions have reduced the size of PCB assemblies using discrete WLCSP chips, including reducing the size of a discrete BLE WLCSP PCB assembly from 5.0×4.0 mm to 3.5×3.5 mm, a 38% reduction in area. In addition the SESUB assembly is only 300 microns (0.3 mm) thick, significantly thinner than common 1.0 and 1.6 mm PCBs with 2-4 layers. Other advantages of SESUB include better heat dissipation and low noise emission. As a result, at least one very large smart phone manufacturer is using SESUB, although with little publicity. Before the entire device is coated, solder tabs approximately 4 mm wide and 0.15 mm thick will be used to press fit into the printed circuit board and will be spot or laser welded onto the battery terminal. Solder used will be flux free so that there will be no outgassing during coating. The entire device is coated with an advanced Parylene HT or equivalent film approximately 25 microns thick capable of enduring multiple (5, 10, or more) washing, drying, and laundry cycles.

As mentioned above, the size of the battery and chip are preferably minimized so that installation of the chip in the fashion-item is unobtrusive or unnoticeable to the causal observer. To this end, the wireless BLE chips of the invention have a thickness of less than 15 mm, a length of 15 mm, and a width of less than 7 mm. More specifically, the exemplar embodiment will be a family of wireless microelectronic devices optimized for market segment and application can include:

Small. 9.7 Diameter×4.3 mm High (using one 3 V CR927 9.5×2.7 mm battery); battery life of approximately 7 to 10 years when worn every one to two weeks, respectively. This is about half the diameter of a dime. This unit may be for childrenswear, sportswear, footwear, and some menswear which are worn more frequently.

The Single BLE Processor Device would include only the ATBTLC1000 or equivalent, the CR927 battery, the MM8491Q or equivalent motion sensor and associated resistors, capacitors, inductors and other passive devices and the PC board including the antenna. The entire device would be coated with a Parylene HT or equivalent film approximately 25 microns thick. This single processor device is the simplest and most compact embodiment.

The Two Processor BLE Device would be the same as the Single BLE Processor Device immediately above except that a PIC12(L)F1572 8-bit microcontroller would be added. This would allow several parts of the BLE stack not necessary for our very simple task in the ATBTLC1000 to be turned off. For example, most of the ATBTLC1000's BLE profiles (security, entertainment, automotive, sports, fitness, etc.) and drivers for unused hardware peripherals would not be needed for our application. Turning them off and using a much smaller BLE stack specifically designed for our application in the simpler, lower power 8-bit PIC microcontroller could result in some overall power consumption savings and thus battery life improvements as we learn more from testing in the future.

Smaller. 8.1×4.2 mm (using two 1.5V 7.9×1.25 mm SR712SW batteries; battery life 5 to 8 years when worn every two to four weeks, respectively. This is about 40% of the diameter of a dime. This unit may be for menswear, sportswear, and footwear which may be worn with some frequency.

The Single BLE Processor Device would include only the ATBTLC1000 or equivalent, the two SR712SW batteries, the MM8491Q or equivalent motion sensor and associated resistors, capacitors, inductors and other passive devices and the PC board including the antenna. The entire device would be coated with a Parylene HT or equivalent film approximately 25 microns thick. This single processor device is the simplest and most compact embodiment.

The Two Processor BLE Device would be the same as the Single BLE Processor Device immediately above except that a PIC12(L)F1572 microcontroller would be added. This would allow several parts of the BLE stack not necessary for our very simple task in the ATBTLC1000 to be turned off. For example, most of the ATBTLC1000's BLE profiles (security, entertainment, automotive, sports, fitness, etc.) and drivers for unused hardware peripherals would not be needed for our application. Turning them off and using a much smaller BLE stack specifically designed for our application in the simpler, lower power 8-bit PIC microcontroller could result in some overall power consumption savings and thus battery life improvements as we learn more from testing in the future.

Smallest. 6.0 mm diameter×4.1 mm height (using two 1.5V, 5.8×1.25 mm SR512SW batteries; battery life over 5 to 6 years when worn every four to six weeks, respectively. This is about one third the diameter of a dime. This unit may be for physically small apparel items and accessories and items such as designer dresses which are worn only for special occasions.

The Single BLE Processor Device would include only the ATBTLC1000 or equivalent, the two SR512SW batteries, the MM8491Q or equivalent motion sensor and associated resistors, capacitors, inductors and other passive devices and the PC board including the antenna. The entire device would be coated with a Parylene HT or equivalent film approximately 25 microns thick. This single processor device is the simplest and most compact embodiment.

The Two Processor BLE Device would be the same as the Single BLE Processor Device immediately above except that a PIC12(L)F1572 microcontroller would be added. This would allow several parts of the BLE stack not necessary for our very simple task in the ATBTLC1000 to be turned off. For example, most of the ATBTLC1000's BLE profiles (security, entertainment, automotive, sports, fitness, etc.) and drivers for unused hardware peripherals would not be needed for our application. Turning them off and using a much smaller BLE stack specifically designed for our application in the simpler, lower power 8-bit PIC microcontroller could result in some overall power consumption savings and thus battery life improvements as we learn more from testing in the future.

High End With AES-256 Devices. These will include both Transmit and Receive capability and NSA-Level AES-256 Encryption. These units may be for expensive, frequently counterfeited somewhat larger items such as handbags from Hermes and other brands and for other expensive apparel and accessories. A consumer may wish to turn off her embedded device transmit signal at times for privacy so that others would not be able to detect signals from her clothing. To meet this need, the High End Device transmission could be turned off using a simple command in her smartphone app. And she could buy apparel and accessory items embedded with the High End Device knowing that all communication between her smartphone and the device embedded into the item of interest is encrypted at NSA levels and is secure.

The Single BLE Processor Device would include only the ATBTLC1000 or equivalent, a CR927, CR1025, CR1216, CR1220, CR1225, CR1612, CR1616, CR1620, CR2016, CR2020, or CR2032 battery, the MM8491Q or equivalent motion sensor and associated resistors, capacitors, inductors and other passive devices and the PC board including the antenna. The entire device would be coated with a Parylene HT or equivalent film approximately 25 microns thick. This single processor device is the simplest and most compact embodiment.

The Two Processor BLE Device would be the same as the Single BLE Processor Device immediately above except that a PIC12(L)F1572 8-bit microcontroller would be added. This would allow several parts of the BLE stack not necessary for our very simple task in the ATBTLC1000 to be turned off. For example, most of the ATBTLC1000's BLE profiles (security, entertainment, automotive, sports, fitness, etc.) and drivers for unused hardware peripherals would not be needed for our application. Turning them off and using a much smaller BLE stack specifically designed for our application in the simpler, lower power 8-bit PIC microcontroller could result in some overall power consumption savings and thus battery life improvements as we learn more from testing in the future.

The App on the smartphone includes user friendly screens including home screen and "See Something You Like . . . Start Scanning," "Shop The Look," "We Found 2 Looks In Your Vicinity . . . Please Choose," "Scanning," "Information on Selected Items," and "Thank You, Your Order 12345 Will Be Dispatched Now," (see FIGS. 2A-G). In addition, the app will contain a geo-location arrow so that the user can point the phone and app in the direction of the desired item when there are many apparel and accessory items with chips in the surrounding area.

A database residing on a cloud server includes supplier, model, size, color, other item descriptors; the embedded device model number, serial number, other device descriptors; smartphone supplier, network, carrier, and related information; consumer demographic information including age, gender, ethnicity, income range, home zip code, education if available, other available demographic information; and geolocation data. The system is configured to provide complete raw data to the brand or retailer for that brand/retailer's customers. However, the system, as part of its agreement with the brand/retailer, will also keep a copy of the complete raw but anonymized data for each brand/retailer. Anonymized data can include all the raw data described above but specifically excluding personal consumer data including name, street address, phone number, social security number, driver license number, email address, debit and credit card number, bank account numbers, passport number, and other data which would allow the person to be specifically identified. Thus identity-specific consumer data will not be kept by the system for consumer privacy protection and to follow all applicable national, international, state, and local laws. As anonymized data is accumulated from many consumers and many brands, the database will allow invaluable insight into consumer behavior, since the system database may be the only database with such detailed data from consumers of many fashion brands.

The brand or retailer can offer a small discount to the consumer in exchange for the consumer agreeing to allow the embedded wireless microelectronic device to transmit periodically.

By turning everyday "people watching" into commerce, the system will deliver a powerful avenue in which to move more product. One of the keys to selling anything successfully is to focus on stimulating the consumer to buy impulsively and to appeal to their emotional side and not their rational side. The technology platform addresses these needs by giving the consumer real-time information on the exact item he or she sees in person, including the attention it gathers from others. Plus, if s/he wants the item they see, they can instantly buy it with one press on their smartphone.

Rather than trusting on the rack, or online consignment, the embedded microelectronic device allows products to be resold in real time. Outside of the showroom, sponsors of the brand, models, or consensually participating customers act as a one-person sales show allowing the consumer to purchase their used item, or items, on the spot. The app will identify all apparel items within the specified detection range available for secondhand instantaneous resale and retrieve the information detailing the clothing piece from the cloud server. Within seconds the consumer can buy the item from the model and the app will arrange delivery and payment, eliminating uncertainty in consignment for the seller and the consumer.

The system gives brands a quantum leap in advertising effectiveness. They no longer have to push TV or print ads toward consumers with virtually no feedback. They no longer have to try to determine what the consumer wants from words (i.e., search keywords) despite the very visual reality of fashion. They don't have to rely on the consumer using a technology which over decades has proven to primarily be useful in tightly controlled cleanroom environments at very short working distances (computer vision) to perform perfectly at much longer distances in much more complex, uncontrolled real life environments to describe what he or she wants. Instead, the brands will get a highly reliable indication of specific interests in style, color, fabric, size, and item as a function of his or her demographics and location. Finally, brands are able to do what they have tried to do for decades—immediately capitalize on the consumer's impulse to buy outside the store when he or she first becomes interested—on the street, without incurring the substantial cost of the physical store.

NSA-level encryption can be hard-wired in a proprietary computer chip from LucidPort. LucidPort has developed a powerful new computer security product called Chameleon (LucidPort—Chameleon) which has full AES (Advanced Encryption Standard) 256-bit encryption hardwired into a chip inside the Chameleon using technology which prevents techniques shown in the LucidPort and Princeton videos from working. The NSA has approved AES-256 encryption for information classified as Top Secret. A brute force attack on 256-bit AES encryption would take longer than the age of the universe to complete using today's computer chip technology (page four, Wikipedia article on Advanced Encryption Standard). If one assumes that Moore's Law continues indefinitely, it is estimated that it would still take approximately 200 years before a massively distributed brute force attack could be attempted on 256-bit AES encryption (page two, "Is Encryption Really Crackable?", George Ou, ZDnet, Apr. 30, 2006). If an attacker does not have the digital encryption key or does not have the Chameleon, LucidPort is not aware of a way that the attacker could get into the computer or its data.

This powerful technology will dramatically increase security and privacy for IoT applications. Luxury brands using the system will allow their consumers to "out" counterfeit merchandise on the street. Customs agencies will have a powerful new tool to quickly detect counterfeit apparel and accessories from brands incorporating the technology.

The systems and methods according to aspects of the disclosed subject matter may utilize a variety of computer and computing systems, communications devices, networks and/or digital/logic devices for operation. Each may, in turn, be configurable to utilize a suitable computing device that can be manufactured with, loaded with and/or fetch from some storage device, and then execute, instructions that cause the computing device to perform a method according to aspects of the disclosed subject matter.

A computing device can include without limitation a mobile user device such as a mobile phone, a smart phone and a cellular phone, a personal digital assistant ("PDA"), such as a BlackBerry®, iPhone®, a tablet, a laptop and the like. In at least some configurations, a user can execute a browser application over a network, such as the Internet, to view and interact with digital content, such as screen displays. A display includes, for example, an interface that allows a visual presentation of data from a computing device. Access could be over or partially over other forms of computing and/or communications networks. A user may access a web browser, e.g., to provide access to applications and data and other content located on a website or a webpage of a website.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The user's computing device may be part of a network of computing devices and the methods of the disclosed subject matter may be performed by different computing devices associated with the network, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" includes any and all of the above discussed logic circuitry, communications devices and digital processing capabilities or combinations of these.

Figure 4A:
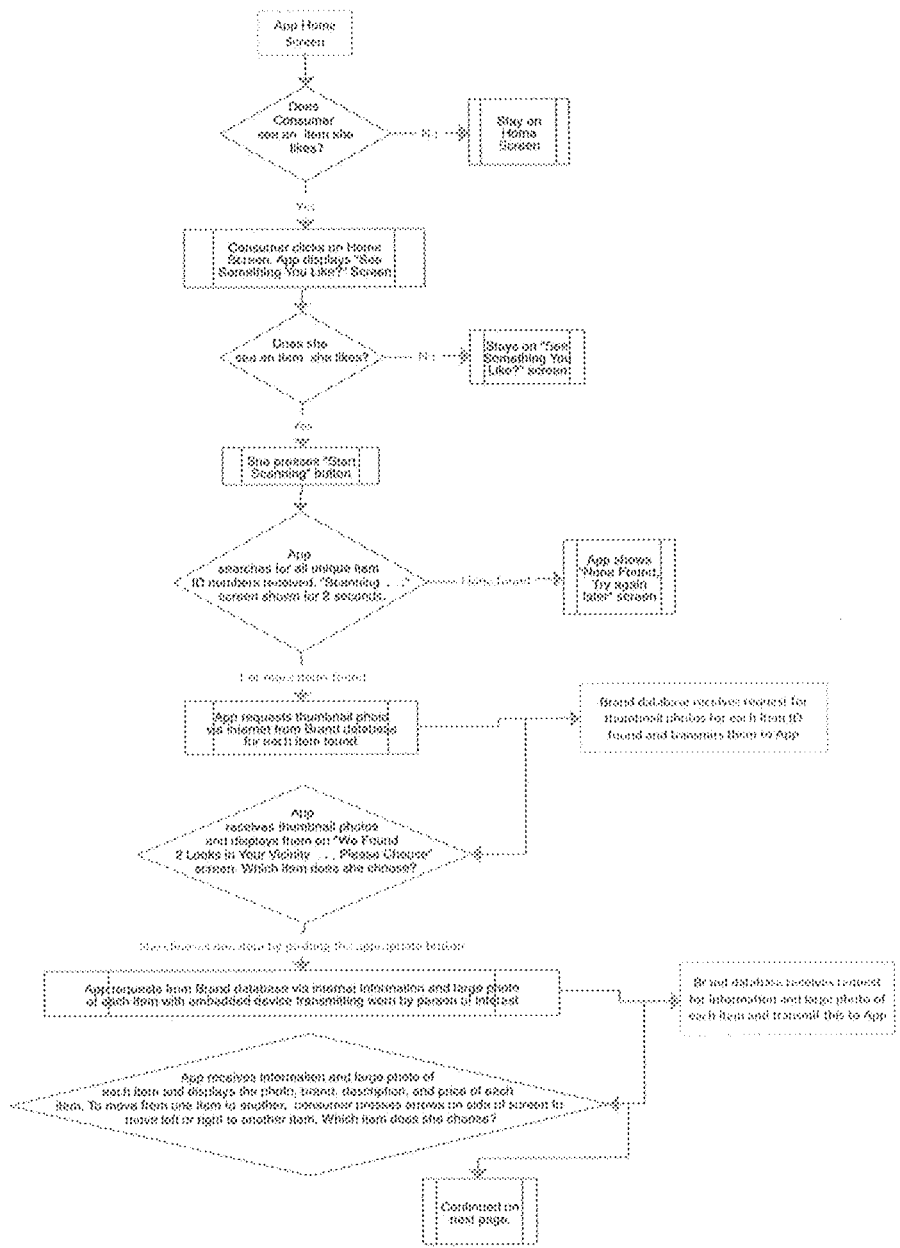
FIGS. 4A and 4B are software flow charts describing the app and server software, including its databases, utilized in accordance with one of the preferred embodiments of the system. These figures also summarize at a high level how the system communicates with the software systems of fashion brands and retailers.
Figure 4B:
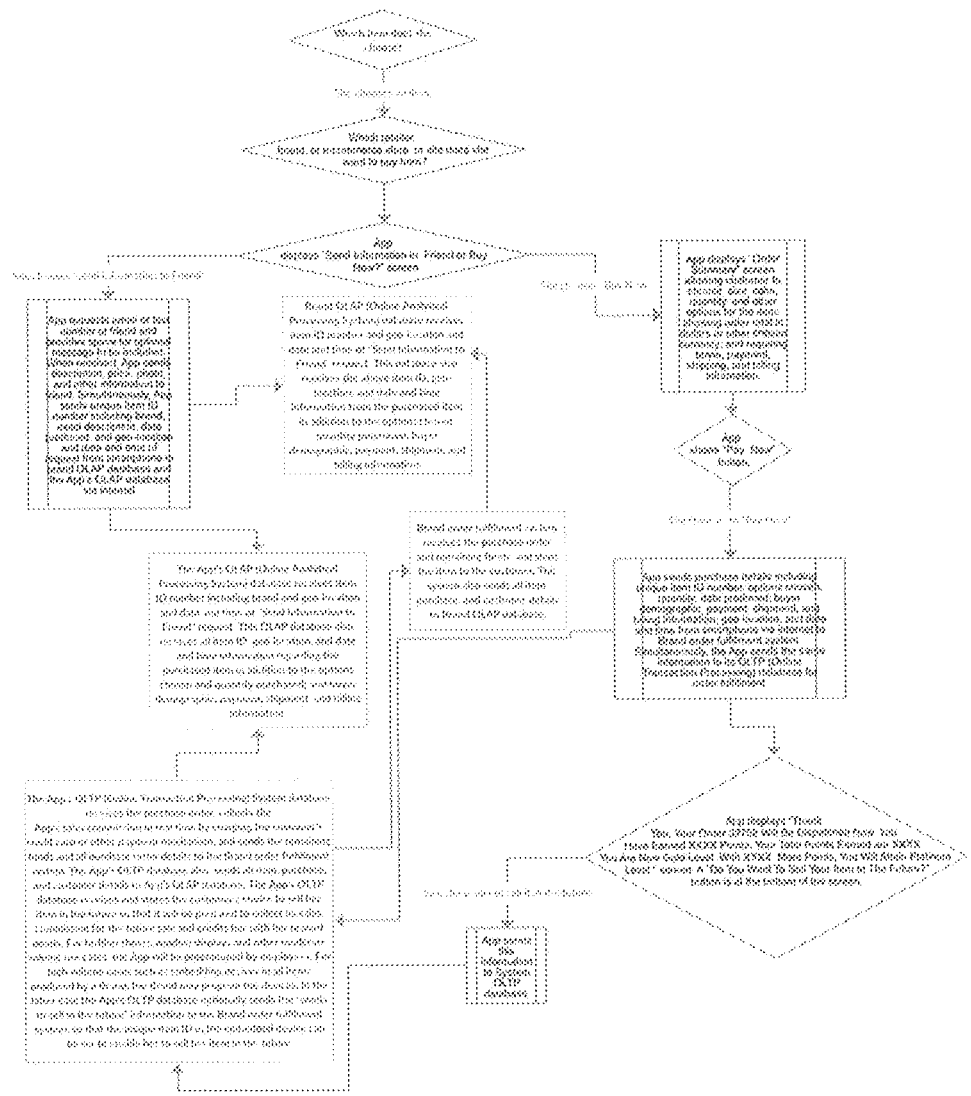

Certain embodiments of the disclosed subject matter may be described for illustrative purposes as steps of a method that may be executed on a computing device executing software, and illustrated, by way of example only, as a block diagram of a process flow, and illustrative example of which is shown in attached FIGS. 4A and 4B. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine-readable medium is a tangible storage device and the instructions are stored in a non-transitory way. At the same time, during operation, the instructions may at some times be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

Additionally, a communication system of the disclosure comprises: a sensor as disclosed; a server computer system; a measurement module on the server computer system for permitting the transmission of a measurement from a detection device over a network; at least one of an API (application program interface) engine connected to at least one of the detection device to create a message about the measurement and transmit the message over an API integrated network to a recipient having a predetermined recipient user name, an SMS (short message service) engine connected to at least one of the system for detecting physiological parameters and the detection device to create an SMS message about the measurement and transmit the SMS message over a network to a recipient device having a predetermined measurement recipient telephone number, and an email engine connected to at least one of the detection device to create an email message about the measurement and transmit the email message over the network to a recipient email having a predetermined recipient email address. Communications capabilities also include the capability to communicate and display relevant performance information to the user, and support both ANT+ and Bluetooth Smart wireless communications. A storing module on the server computer system for storing the measurement in a detection device server database can also be provided. In some system configurations, the detection device is connectable to the server computer system over at least one of a mobile phone network and an Internet network, and a browser on the measurement recipient electronic device is used to retrieve an interface on the server computer system. In still other configurations, the system further comprising: an interface on the server computer system, the interface being retrievable by an application on the mobile device. Additionally, the server computer system can be configured such that it is connectable over a cellular phone network to receive a response from the measurement recipient mobile device. The system can further comprise: a downloadable application residing on the measurement recipient mobile device, the downloadable application transmitting the response and a measurement recipient phone number ID over the cellular phone network to the server computer system, the server computer system utilizing the measurement recipient phone number ID to associate the response with the SMS measurement. Additionally, the system can be configured to comprise: a transmissions module that transmits the measurement over a network other than the cellular phone SMS network to a measurement recipient user computer system, in parallel with the measurement that is sent over the cellular phone SMS network.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device for transmitting real-time identification of a fashion item for receipt by a portable wireless computing device operated by a consumer located in a non-store location observing the fashion item, the device comprising:
   a Bluetooth fashion-item identification chip including,
   (a) a fashion-item-use sensor which generates an item-in-use signal when detecting a predefined item-in-wear condition;
   (b) a processor operably connected to the fashion-item-use-sensor, the processor being programmed to cause transmission of intermittent short pulses of a Bluetooth, low energy fashion-item-identification signal upon receipt by the processor of the item-in-use signal from the fashion-item-use sensor;
   (c) a Bluetooth low energy transmitter operably linked to the processor, the Bluetooth low energy transmitter transmitting intermittent short pulses of the fashion-item-identification signal for receipt by the portable wireless computing device carried by the consumer observing the fashion-item;
   (d) a battery operably connected to the fashion-item-use sensor, Bluetooth low energy transmitter, and the processor for providing power to operate the device; and
   (e) a machine washable coating deposited around the periphery of the device for protecting the interior of the device from repeated exposure to water, heat, and chemicals utilized to maintain the fashion item.

2. The device for real-time identification of a fashion item of claim 1 wherein the fashion-item use sensor is a motion sensor programmed to generate a fashion-item-in-use signal and wherein the fashion-item in-wear signal is movement of the fashion-item for at least a predetermined period of time.

3. The device for real-time identification of a fashion item of claim 1 wherein the processor is programmed to enter a hibernation mode in which transmission of the fashion-item identification signal is discontinued upon extinguishment of the fashion-item-in-use signal in order to conserve battery life.

4. The device for real-time identification of a fashion-item of claim 3 wherein the processor is programmed to enter a hibernation mode with a low energy consumption of between 20 and 45 nanoamps.

5. The device for real-time identification of a fashion-item of claim 3 wherein the fashion-item-use sensor is a motion sensor with including a capacitor having a tilt sensing mode with motion sample intervals of at least 10 seconds.

6. The device for real-time identification of a fashion item of claim 1 wherein the fashion item is a garment and wherein the Bluetooth fashion-item identity device is dimensioned for unobtrusive installation in the garment with the device having a thickness of less than 7 mm and length of less than 15 mm and width of less than 15 mm.

7. The device for real-time identification of a fashion item of claim 6 wherein all of the peripheral surfaces of the Bluetooth fashion-item identity chip are coated with a suitable heat, moisture and chemical resistant, water vapor deposited poly(p-xylene) polymer to a thickness of about 25 microns.

8. The device for real-time identification of a fashion-item of claim 1 wherein the chip further comprises a receiver for receiving wireless signals and wherein the processor is programmed to transmit a brand specific authentication signal from the transmitter upon receiver receiving a brand specific authentication request signal to allow for real-time authentication that the fashion-item is an authentic branded fashion-item, rather than a counterfeit item.

9. The device for real-time identification of a fashion-item of claim 8 wherein the Bluetooth fashion-item identity chip is dimensioned for unobtrusive permanent installation in at least one of the fashion-items comprising garments, hats, hand bags, scarves, wallets and shoes.

10. The device for real-time identification of a fashion-item of claim 1 wherein the fashion-item-use sensor is one of at least a motion sensor and a light sensor.

11. The device for real time identification of a fashion-item of claim 1 wherein the coating deposited around the periphery of the device is a vapor deposit coating selected for resistance for a period of at least one year to weekly exposure to the temperatures utilized to launder garments, to the chemicals utilized to launder garments, and to the mechanical stresses resulting from the process of pressing or ironing a garment.

12. The device for real-time identification of a fashion item of claim 1 wherein the fashion-item-identification signal stored in the chip is a unique multiple-digit number associated with product database which indicates at least a vendor, style, and color for each different fashion-item.

13. The device for real-time identification of a fashion item of claim 1 wherein the fashion-item-identification signal stored in the chip is a BLE packet transmitting a payload of between 1 and 37 bytes.

14. The device for real-time identification of a fashion item of claim 1 wherein the fashion-item-identification signal stored in the chip is a BLE packet transmitting a payload of between 1 and 296 bits.

15. The device for real-time identification of a fashion item of claim 1 wherein the Bluetooth fashion-item identity device is dimensioned for unobtrusive installation in the fashion-item with the device having a thickness of less than 4 mm and length of less than 10 mm and width of less than 10 mm.

16. The device for real-time identification of a fashion item of claim 1 further comprising a printed circuit board for electrically connecting the battery, processor, and fashion-item-in-use sensor and the printed circuit board includes at least two solder tabs press fit thereon and welded onto the battery terminal.

17. The device for real-time identification of a fashion item of claim 16 wherein the printed circuit board constitutes a semiconductor embedded in substrate device.

18. The device for real-time identification of a fashion-item of claim 1 wherein the processor is programmed to draw less than 4 microamps while transmitting the fashion-item-identification signal to a range of at least 20 feet.

19. The device for real-time identification of a fashion-item of claim 1 wherein the processor is programmed to transmit the fashion-item-identification signal in pulses having an advertising interval of one of at least 760 milliseconds, 852.5 milliseconds, and 1022.5 milliseconds.

20. The device for real-time identification of a fashion item of claim 1 wherein the fashion item is a garment and wherein the Bluetooth fashion-item identity device is dimensioned for unobtrusive installation in the garment with the device having a thickness between 3 mm and 10 mm, a length of between 6 mm and 10 mm and a width of between 5 mm and 10 mm.

21. The device for real-time identification of a fashion item of claim 1 wherein the battery has a capacity of between 5 milliamp-hours and 33 milliamp hours.

22. The device for real-time identification of a fashion item of claim 1 further comprising a second processor connected to the battery for turning on and off device functions in order to lower overall device power consumption to extend battery life.

23. The device for real-time identification of a fashion item of claim 1 further comprising a receiver operably connected to the processor for receipt of signals from a consumer wearing or in possession of the fashion item and wherein the processor is programmed to receive a privacy-on signal from the consumer wearing or in possession of the fashion item which temporarily prevents transmission of the fashion-item-identification signal until receipt by the processor of privacy-off signal.

24. A system for real-time identification of a fashion item observed by a consumer in a non-retail store location and for purchasing the identified fashion-item electronically in real-time, the system comprising:

a wireless Bluetooth fashion-item identity chip including a fashion-item use sensor generating a fashion-item in-use signal when detecting a fashion-item in-wear condition; a processor operably connected to the fashion-item use sensor; the processor being programmed to transmit intermittent short pulses of a unique, Bluetooth fashion-item identification signal upon detection of a fashion-item in-use signal by the fashion-item use sensor; a battery operably connected to the fashion-item in use sensor and processor for providing power to the chip; and a machine washable coating deposited around the periphery of the wireless Bluetooth identity chip for protecting the chip from water, heat, and cleaning chemicals utilized in the process of laundering the fashion-items;

a portable computing device having a Bluetooth signal receiver, a smartphone processor operably connected to the Bluetooth signal receiver, the smartphone processor running a fashion-item identification/purchase application program, the fashion-item identification/purchase application providing a consumer an interface, to the application being programmed to cause the Bluetooth signal receiver to scan for and detects any fashion-item identification signal generated by a wireless Bluetooth fashion-item identification chips within range of the Bluetooth signal receiver, the fashion-item identification/purchase application being programmed to cause the wireless communication member of the portable computing device to connect with a remote server; and a remote server programmed for communication with a portable computing device fashion-item identification/purchase application, the remote server having access to a stored database containing at least customer identification information, the remote server being programmed to receive a purchase identified fashion-item signal from a customer utilizing the portable computing device garment identification/purchase application in order to purchase the identified fashion-item, the remote server being programmed to cause the purchased fashion item to be delivered to the customer that sent the purchase identified fashion-item signal.

25. The system for real-time identification of a fashion item of claim 24 wherein the fashion-item-identification signal stored in the Bluetooth fashion-item identification chip is a unique multiple-digit number associated with product database which indicates at least a vendor, style, and color for each fashion-item purchased utilizing the system.

26. The system for real-time identification of a fashion item of claim 24 wherein the system allows purchase of a plurality of different fashion-items, each of the fashion-items bearing one of a plurality of fashion brand names, being sold by one of a plurality, of different vendors, and being manufactured by one of a plurality manufactures and wherein the wireless Bluetooth identity chip for each of the plurality of fashion-items identifies at least one of the brand, vendor, and manufacturer for each of the plurality of fashion-items.

27. The system for real-time identification of a fashion item of claim 24 wherein the remote server is further programmed for storing in a database anonymized data generated during each purchase utilizing the system and wherein the database includes information concerning each fashion-item purchased as well as information concerning at least one of a plurality of fashion-item brand, fashion-item vendor, fashion-item manufacturer, and fashion-item retailer for each of the fashion-item purchased utilizing the system.

28. The system for real-time identification of a fashion item of claim 24 wherein stored anonymized data in the database is analyzed for fashion trends and marketing information across vendor, brands, and retailers.

29. The system for real-time identification of a fashion item claim 24 wherein stored anonymized data in the database is utilized to award the customer reward points that the customer can redeem for additional fashion-item purchases across a plurality of vendor, brands, and retailers.

* * * * *